US007096088B2

(12) United States Patent
Graushar et al.

(10) Patent No.: US 7,096,088 B2
(45) Date of Patent: Aug. 22, 2006

(54) COMBINED MAILING STREAMS

(75) Inventors: William Graushar, Wauwatosa, WI (US); John Geres, West Allis, WI (US)

(73) Assignee: Quad/Graphics, Inc., Sussex, WI (US)

( * ) Notice: Subject to any disclaimer, the term of this patent is extended or adjusted under 35 U.S.C. 154(b) by 286 days.

(21) Appl. No.: 10/262,116

(22) Filed: Oct. 1, 2002

(65) Prior Publication Data

US 2003/0062293 A1 Apr. 3, 2003

Related U.S. Application Data

(60) Provisional application No. 60/326,324, filed on Oct. 1, 2001.

(51) Int. Cl.
*G06F 7/00* (2006.01)

(52) U.S. Cl. .................... 700/223; 700/220; 270/1.02; 270/1.03; 270/52.02

(58) Field of Classification Search ............... 270/1.01, 270/1.02, 1.03, 52.02; 700/219, 220, 221, 700/223, 224, 226, 227; 53/284.3
See application file for complete search history.

(56) References Cited

U.S. PATENT DOCUMENTS

| | | | | |
|---|---|---|---|---|
| 4,149,711 | A * | 4/1979 | Jackson | 270/1.02 |
| 4,789,147 | A * | 12/1988 | Berger et al. | 270/1.03 |
| 5,114,128 | A * | 5/1992 | Harris et al. | 270/1.03 |
| 5,317,654 | A * | 5/1994 | Perry et al. | 382/101 |
| 5,547,175 | A * | 8/1996 | Graushar et al. | 270/37 |
| 5,818,724 | A * | 10/1998 | Brewster et al. | 700/220 |
| 6,167,326 | A * | 12/2000 | Graushar et al. | 700/223 |
| 6,192,295 | B1 * | 2/2001 | Gunther | 700/225 |

* cited by examiner

*Primary Examiner*—Patrick Mackey
(74) *Attorney, Agent, or Firm*—Michael Best & Friedrich LLP

(57) ABSTRACT

A method of combining mail streams in a printing finishing process including the acts of generating a master mailing list having a sequence, forming a fist mail stream, forming a second mail stream, and combining the first mail stream and the second mail stream according to the sequence of the master mailing list.

24 Claims, 1 Drawing Sheet

COMBINED MAILING STREAMS

RELATED APPLICATIONS

This application claims the priority benefit under 35 U.S.C. § 119(e) of U.S. Provisional Patent Application No. 60/326,324 filed on Oct. 1, 2001.

FIELD OF THE INVENTION

The invention relates to the combination of mail streams in a printing finishing process.

BACKGROUND OF THE INVENTION

With increasing postal costs and rates, printers and publishers are looking for ways to mail printed products more cost effectively. Combining two or more titles into one mail stream is one way to achieve postal savings. However, the combination of two or more mail streams in a production setting has proven complex and difficult.

SUMMARY OF THE INVENTION

The invention is a method for combining at least two separate mail streams in a finishing process. In one embodiment, one mail stream is from a stitcher and the other mail stream is from a shuttle hopper.

The present invention includes a method of combining two mail streams on a printing finishing line including providing a master mailing list including a sequence of recipients, assembling printed products from individual printed pieces to form a first mail stream, providing a second mail stream of bound printed products to the finishing line, and combining the first and second mail streams in the sequence of the master mailing list.

The present invention includes a method of combining two mail streams on a printing finishing line including providing a master mailing list including a sequence of recipients, assembling printed products from individual printed pieces to form a first mail stream, storing the first mail stream in a buffer, providing a second mail stream of bound printed products to the finishing line downstream of the buffer, and combining the first and second mail streams in the sequence of the master mailing list.

The present invention includes a method of combining two mail streams on a printing finishing line including providing a master mailing list including a sequence of recipients, assembling printed products using pockets and a stitcher to form a first mail stream, storing the first mail stream in a buffer, providing a second mail stream of bound printed products to the finishing line downstream of the buffer using a shuttle hopper, and combining the first and second mail streams in the sequence of the master mailing list at a mail table by selectively feeding printed products from the buffer and from the shuttle hopper.

The present invention includes a method for combining two mail streams on one printing finishing line including providing a master mailing list including a sequence of recipients, assembling printed products from individual printed pieces to form a first mail stream, the first mail stream including gaps into which printed products from a second mail stream will eventually be placed, assembling a third stream of printed products and temporarily positioning them in the gaps, diverting the third stream from the finishing line to thereby open the gaps, providing the second mail stream of bound printed products to the finishing line downstream, and combining the first and second mail streams in the sequence of the master mailing list such that the printed products of the second mail stream are placed into the gaps.

Figure 1:
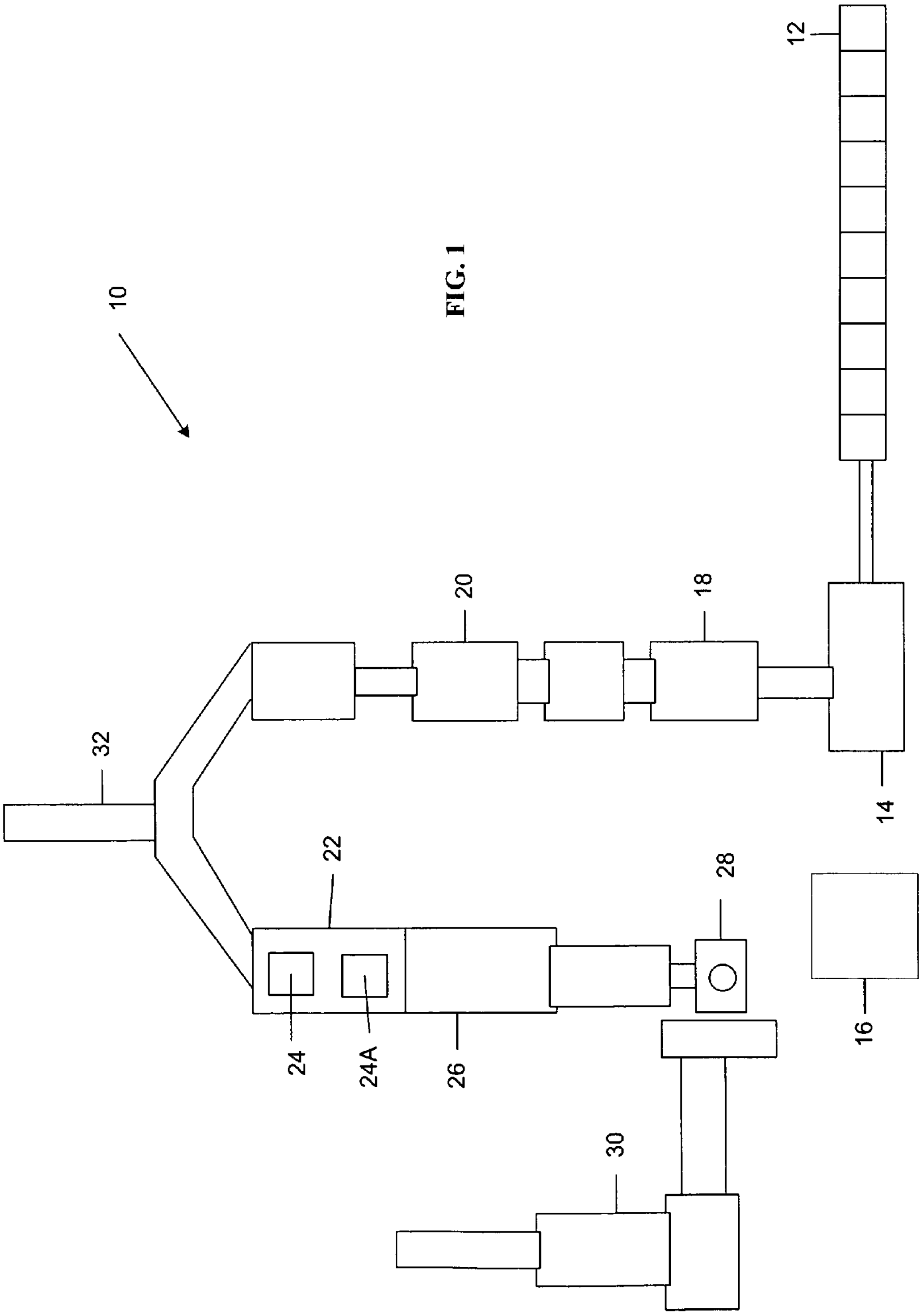
FIG. 1 is a schematic of the finishing process of the present invention.

Before one embodiment of the invention is explained in detail, it is to be understood that the invention is not limited in its application to the details of construction and the arrangement of components set forth in the following description or illustrated in the drawing. The invention is capable of other embodiments and of being practiced or being carried out in various ways. Also, it is to be understood that the phraseology and terminology used herein is for the purpose of description and should not be regarded as limiting.

DETAILED DESCRIPTION

The invention includes a method for combining at least two separate mail streams in a finishing process. In one embodiment, one mail stream is from a stitcher and the other mail stream is from a shuttle hopper. However, it should be noted that the mail steams can be from other pieces of finishing equipment or from other manufacturing lines as will be detailed below.

With reference to FIG. 1, a finishing line 10 is illustrated to manufacture bound printed products such as books, magazines, catalogs, direct mail pieces and the like. The finishing line 10 includes a series of pockets 12 to feed printed pieces to the finishing line 10 to create a first mail stream. The number of pockets 12 varies depending upon the title or titles to be bound on the finishing line 10. A stitcher 14, such as a saddle stitcher, then binds the individual printed pieces together. However, it should be noted that other types of binders and other methods of binding the printed products can be utilized with the present invention such as a perfect binder.

The feeding of the printed pieces to the finishing line 10 is controlled by a controller 16 such as the FCS controller available from QTI of Sussex, Wis. The controller 16 assembles the printed products according to a master mailing list of recipients. The assembly can be demographic such that the controller 16 assembles a printed product based upon individual recipient information, as is known in the art. Further, the controller 16 may control the simultaneous assembly of more than one title or version of the printed products using the pockets 12 and stitcher 14, a process termed multi-binding. For example, two titles can be simultaneously assembled and bound using the same set of pockets 12 and stitcher 14. The two titles would be assembled according to a master mailing list in a specific order to obtain optimum postal discounts. Three or more titles could also be assembled using this multi-binding process.

After binding, the printed products are conveyed to and trimmed by a trimmer 18. After the trimmer 18, this first mail stream enters a buffer storage system or buffer 20. The buffer 20 is preferably a conveyor type buffer such as that available from Sitma of Italy as model 953 and preferably can hold 100–400 printed products. The buffer 20 holds then delivers the printed products to a mail table 22 as needed and as controlled by the controller 16 as will be further explained below.

Preferably, a second mail stream enters the finishing line 10 at the mail table 22 via a loader such as a shuttle hopper 24. It should be noted that other types of equipment could be utilized to deliver the second mail stream to the mail table 22. The shuttle hopper 24 feeds the printed products of the second mail stream to the same mail table 22 where printed products of the first mail stream are delivered. The second mail stream includes already bound printed products that may or may not be pre-addressed. If pre-addressed, optionally a verification step can occur during which each printed product is checked to make sure the address indicia thereon is the same address indicia for the printed product in that sequence position according to the master mailing list.

The two mail streams are combined at the mail table 22 so an intended master mailing list sequence is produced. The master mailing list sequence includes the recipients of both mail streams. Such a combination of two mail streams is designed to increase postal discounts and/or reduce the postal rates on the combined mail stream. The sequence of the master mailing list is known to the controller 16. The controller 16 controls the assembly of the printed products of the first mail stream and controls the feeding of the printed products of the second mail stream to the mail table 22. Thereby, at the mail table 22, the two streams are combined in the proper order according to the master mailing list sequence. The sequence determines whether the buffer 20 or the shuttle hopper 24 delivers an individual printed product to the mail table 22.

When the printed products of the first mail stream exit the buffer 20, the controller 16 instructs the buffer 20 to leave gaps in the stream, i.e., empty chain slots, into which printed products of the second mail stream will be placed at the mail table 22. The controller 16 and the buffer 20 operate together to feed the printed products of the first mail stream to the mail table 22 when needed according to the master mailing list. The mail table 22 therefore runs at a faster average speed than the stitcher 14 to accommodate both mail streams. The number of printed products of the second mail stream delivered to the mail table 22 from the shuttle hopper 24 and into the gaps determines this increased speed.

The buffer 20 has a varying output from that of its input. Printed products can be introduced into the buffer 20 without any printed products being removed from it. The opposite is also true in that printed products can be removed from the buffer 20 without any being introduced. The buffer 20 retains the printed products of the first mail stream in the order they were sent into the buffer in a first in, first out arrangement. As an output, the buffer creates the empty chain slots into which printed products of the second mail stream will be placed at the mail table 22. The buffer 20 operates at varying speeds depending upon input and output requirements which are governed by the need to deliver a particular printed product to the mail table 22 at the correct time as controlled by the controller 16.

The resulting mail stream exiting the mail table 22 is a combination of the first mail stream from the stitcher 14 and the second mail stream from the shuttle hopper 24, with that combination being in the sequence determined by the master mailing list.

Optionally, a second mail table 26 or an extension of the mail table 22 can be used to apply address indicia to the printed products of the combined mail stream. The printed products in the combined mail stream are then conventionally accumulated in a stacker 28 and bundled in the bundle wrapper 30.

With this process, if the stitcher 14 goes down or there are other problems assembling the first stream of printed products, the finishing process can continue functioning with the printed products in the buffer 20 rather than shutting down the entire finishing line. This results in increased efficiency and cost savings especially if the problem can be remedied prior to the buffer 20 running out of printed products.

It should be noted that other layouts of combining two mail streams are covered by the invention. For example, printed products could be diverted to another packaging process which could include the buffer 20 and shuttle hopper 24 or like components. In another example, two buffers 20 can be linked together in series to create increased buffer capacity for the printed products of the first mail stream, such as 200–800 printed products.

It should be noted that multiple shuttle hoppers 24 feeding printed products to the mail table 22 can be employed to combine more than two mail streams. For example, a second shuttle hopper 24A could feed a third stream of printed products to the mail table 22.

In another embodiment of the invention, the empty chain slots that are created in the embodiment described above are temporarily utilized in the assembly of another mail stream. Specifically, the controller 16 using the master mail list sequence determines where empty chain slots need to be created into which printed products from the second mail stream will be placed by the shuttle hopper 24 at the mail table 22. The controller 16 then controls the assembly of another stream of printed products with each printed product being placed temporarily into one of the empty chain slots. The printed products of this mail stream are then diverted from the finishing line 10 prior to the mail table 22 thus making the empty chain slots available for the printed products of the second mail stream, such as, for example, at a divert gate 32.

This process is particularly suited for the assembly of a newsstand version of a printed product which would have no recipient or address information associated with it and would therefore need to be in no particular sequence. Typically, the newsstand version of a title is created on the finishing line 10 either before or after subscriber versions, thus taking up additional time and resources. In the process described herein, the newsstand version is assembled and positioned at each empty chain slot position and then diverted prior to the mail table 22, thus saving time and resources in production.

What is claimed is:

1. A method comprising:

providing a master mailing list including a sequence of recipients;

assembling printed products from individual printed pieces to form a first mail stream on a finishing line;

providing a second mail stream of bound printed products to the finishing line; and combining the first and second mail streams in the sequence of the master mailing list on the finishing line.

2. The method of claim 1 and further including the act of printing address indicia on at least a portion of the printed products of the combined mail stream.

3. The method of claim 1 wherein the first mail stream is assembled using pockets and a saddle stitcher.

4. The method of claim 1 wherein a loader provides the second mail stream to the finishing line.

5. The method of claim 4 wherein the loader is a shuttle hopper.

6. The method of claim 1 wherein the first and second mail streams are combined on a mail table.

7. The method of claim 1 and further including the acts of stacking and bundling the combined mail stream.

8. The method of claim 1 wherein the first mail stream includes at least two different titles assembled in a multi-binding process.

9. The method of claim 1 wherein the first mail stream includes at least two different versions of a printed product assembled in a multi-binding process.

10. The method of claim 1 and further including the act of feeding a third stream of bound printed products to the finishing line.

11. The method of claim 1 wherein the printed products of the second mail stream are pre-addressed.

12. A method of combining two mail streams, said method including:

providing a master mailing list including a sequence of recipients;

assembling printed products from individual printed pieces to form a first mail stream on a finishing line;

storing the first mail stream in a buffer on the finishing line;

providing a second mail stream of bound printed products to the finishing line downstream of the buffer; and combining the first and second mail streams in the sequence of the master mailing list on the finishing line.

13. The method of claim 12 wherein the first mail stream is assembled using pockets and a saddle stitcher.

14. The method of claim 12 wherein the buffer is a conveyor type buffer.

15. The method of claim 12 wherein the second mail stream is provided to the finishing line using a shuttle hopper.

16. A method of combining two mail streams, said method including:

providing a master mailing list including a sequence of recipients;

assembling printed products using pockets and a stitcher to form a first mail stream on a finishing line;

storing the first mail stream in a buffer;

providing a second mail stream of bound printed products to the finishing line downstream of the buffer using a shuttle hopper; and combining the first and second mail streams in the sequence of the master mailing list at a mail table by selectively feeding printed products from the buffer and from the shuttle hopper to the finishing line.

17. The method of claim 16 wherein a controller controls the selective feeding of the printed products to the mail table.

18. The method of claim 16 and further including the acts of supplying a third mail stream of printed products to the mail table and combining the first, second and third mail streams in the sequence of the master mailing list.

19. The method of claim 16 wherein the first mail stream includes at least two different titles.

20. The method of claim 16 wherein the first mail stream includes at least two different versions of a printed product.

21. The method of claim 16 wherein the buffer is a first in, first out type buffer.

22. The method of claim 16 and further including the act of printing indicia on selective printed products of the combined mail stream.

23. A method for combining two mail streams on one printing finishing line, said method including:

providing a master mailing list including a sequence of recipients;

assembling printed products from individual printed pieces to form a first mail stream, said first mail stream including gaps into which printed products from a second mail stream will eventually be placed;

assembling a third stream of printed products and temporarily positioning them in the gaps;

diverting the third stream from the finishing line to thereby open the gaps;

providing the second mail stream of bound printed products to the finishing line downstream; and combining the first and second mail streams in the sequence of the master mailing list such that the printed products of the second mail stream are placed into the gaps.

24. The method of claim 23 wherein the gaps in the first mail stream are created by a buffer into and out of which the first mail stream travels.

* * * * *